United States Patent [19]
Turner

[11] 3,716,139
[45] Feb. 13, 1973

[54] WASTE TREATMENT SYSTEM
[75] Inventor: Abner B. Turner, Greensburg, Pa.
[73] Assignee: Westinghouse Electric Corporation, Pittsburgh, Pa.
[22] Filed: Oct. 15, 1970
[21] Appl. No.: 80,985

[52] U.S. Cl. ............210/104, 210/108, 210/138, 210/149, 210/181, 210/206, 210/275, 210/501, 210/502
[51] Int. Cl. ..................B01d 29/38, B01d 15/06
[58] Field of Search........210/96, 104, 108, 138, 149, 210/152, 181, 202, 206, 264, 275, 500–503, 510

[56] References Cited

UNITED STATES PATENTS

| | | | |
|---|---|---|---|
| 1,752,050 | 3/1930 | Young | 210/501 X |
| 3,382,983 | 5/1968 | Stewart | 210/503 X |
| 3,296,122 | 1/1967 | Karassin et al. | 210/181 X |
| 590,868 | 9/1897 | Wanner et al. | 210/264 |
| 654,783 | 7/1900 | Cole | 210/264 |
| 3,317,047 | 5/1967 | Hansen | 210/152 X |
| 3,401,115 | 9/1968 | Meyer et al. | 210/152 X |
| 3,559,807 | 6/1969 | Reilly | 210/152 X |

Primary Examiner—John Adee
Attorney—A. T. Stratton, Z. L. Dermer and M. B. L. Hepps

[57] ABSTRACT

A solids separation device consisting of a conveyor belt composed of tightly coiled springs, a dry chemical feed system, a surge conditioning tank of minimum size, an incinerator and a maximum flow filtration-absorption system comprising a filter-coagulator, a stripper column, and an absorption column compactly structured for usage under minimum available space conditions.

8 Claims, 2 Drawing Figures

PATENTED FEB 13 1973

3,716,139

WASTE TREATMENT SYSTEM

BACKGROUND OF THE INVENTION

This invention pertains to waste systems and more particularly, to such systems which produce a high quality effluent by utilizing a plurality of filtration and/or absorption columns.

Recently enacted water quality legislation has created the need for a pollution abatement system capable of operating where limited space is available, e.g., aboard ships. Such systems must be small in volume, capable of rapid start up and shut down, operate reliably in a severe environment and treat to a high quality sewage about three times "stronger" than municipal sewage.

Previous systems which were capable of treating waste to a relatively high quality required an excess of equipment and space. Such systems were not adaptable to marine requirements for several reasons: These systems generally required a high volume of chemical conditioners. Each subsystem performed a single function thus necessitating a plurality of such subsystems. And, the system was generally designed around a large surge tank with low flow treatment auxiliary systems.

SUMMARY OF THE INVENTION

A minimum size, maximum effluent quality treatment apparatus is obtained in accordance with this invention by sizing the surge conditioning tank for minimum volume and the filtration-absorption system for maximum flow. The filtration-absorption system performs multiple and overlapping functions to further reduce the size and complexity of the system.

Three columns make up the filtration-absorption system. The media in the first column is a 20 to 50 mesh aluminum powder. This filter medium performs a dual function. First, it removes the conditioned suspended solids remaining in the liquid after the gross solids separation step performed by the coiled spring conveyor separator, and second it adds coagulating ions to the remaining liquid by corrosion of the aluminum powder. These aluminum ions precipitate and coagulate any suspended material and some of the dissolved material remaining in the liquid. After passing through this first filter coagulator column, the liquid goes to a stripper column. The stripper operation is based on the principle of electrophoretic coalescence. The stripper column is filled with a mixture of aluminum powder and granular carbon which react to form a galvanic cell and attract the ions remaining in solution. The third column is filled with activated carbon. Activated carbon has the capability of removing high amounts of COD and BOD by absorption, as is known in the art.

A positive displacement pump is utilized to move the sewage or waste in variable amounts to the filtration columns. By way of example, the pump may generally be programmed to convey the fluid at 3.5 gal. per minute. However, when the surge tank is filled one-half to three-fourths its capacity, the pumping capacity will increase to 7.5 gal. per minute, and when the tank contains greater than three-fourths of its capacity, the pump is programmed to 10 gal. per minute, and as previously explained, the columns are so sized as to efficiently separate solid under maximum flow conditions.

DESCRIPTION OF THE DRAWINGS

For a better understanding of the invention reference may be had to the accompanying illustrative drawings, in which.

DESCRIPTION OF THE PREFERRED EMBODIMENT

Figure 1:
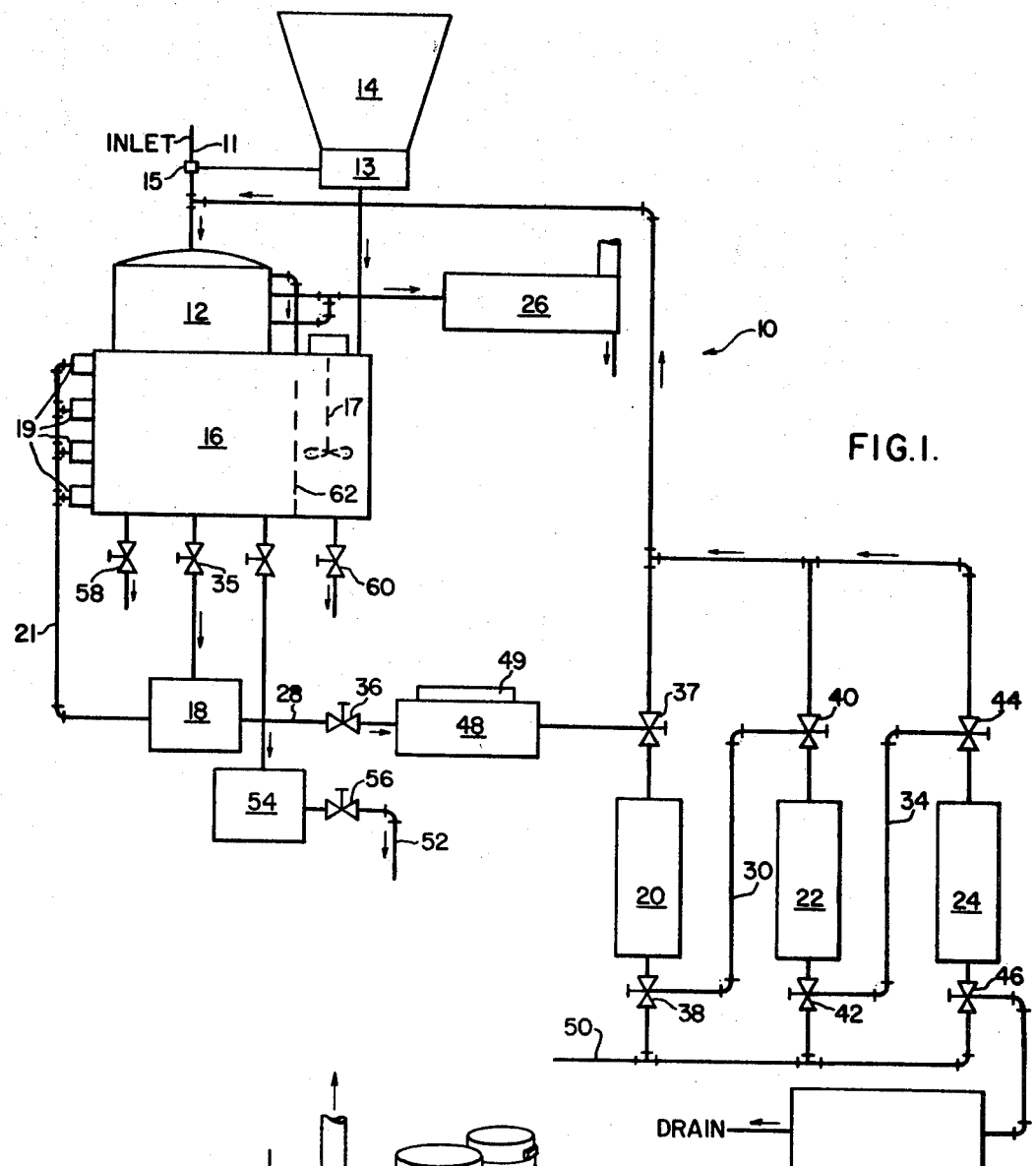
FIG. 1 shows a flow diagram of a waste treatment system in accordance with this invention.

Referring to FIG. 1, there is shown a device 10 which utilizes the concepts of screening, chemical conditioning and filtration-absorption to treat waste. The device 10 essentially consists of a solid separation means 12 which will remove at least 50 percent of the contaminants from the waste, a chemical feed system 14 which will feed conditioning-disinfecting chemicals to the screened liquid, a surge-conditioning tank 16, a variable volume feed pump 18, and a filtration-absorption system comprising three columns, 20, 22 and 24, and an incinerator to dispose of the solids removed from the system; which incinerator is generally designated by the numeral 26.

Raw waste which has traveled only a few hundred feet in the sanitary collection system of for example a marine craft is spread from an inlet line 11 onto a conveyor belt type solid separation device 12. The solid separation device 12 consists of a conveyor belt composed of tightly coiled stainless steel springs (not shown). The unpulped paper and fecal matter are conveyed by the belt to the incinerator 26 while the liquid passes between the coils of the springs which compose the belt. Cleaning discs are located at both ends of the belt to remove objects such as paper towels which might adhere to the springs by surface tension. Other particles which might become attached to the coils of the springs are washed out by the flow of water from above while the springs on the bottom portion of their travel cycle.

The coiled spring, solids separation device is of a well known design in the art and is not described in detail for this reason, but rather forms a part of the broad novel combination of this invention.

The solid matter is conveyed as previously indicated to an incinerator 26. The remaining liquid and small particulate matter then flow by gravity feed into the surge-conditioning tank 16.

The flow of waste on a ship for example is by no means constant. Peak flow will occur at watch change. Tankage to contain greater than average flows is by far the largest volume item in a waste treatment plant of the average design flow rate, is for example, 3.5 gal. per minute, the system should be capable of absorbing up to 300 percent of average flow, or 10.5 gal. per minute. The maximum flow condition would then require a tank 16 of 300 gal. capacity. It is a feature of this invention that the surge-conditioning tank 16 is designed for the minimum volume flow of, for example, 3.5 gal. per minute. The feed pump 18 and filter-absorption units 20, 22 and 24, to be described, are sized to treat the increased flow rather than storing it for later treatment.

Figure 2:
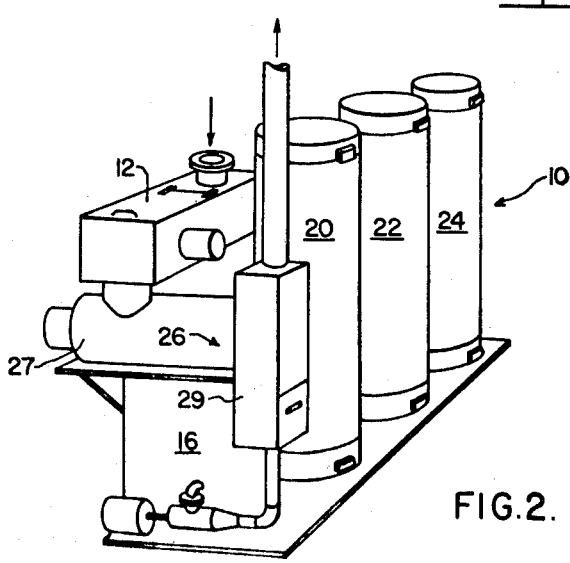
FIG. 2 shows an isometric view of the system indicating the compact manner in which it can be constructed.

As shown in FIG. 2, the surge conditioning tank comprises the core of the system and is used a a structural unit. Conditioning and disinfecting chemicals are added to the tank 16 and the tank 16 contains mixers 17 to assure sufficient contact of chemicals and screened sewage. The materials used for constructing this tank should be such as to resist corrosion from either sea water, sewage or chemicals added to condition the sewage.

A chemical feeder 14 feeds dry chemicals in small, closely controlled amounts in proportion to the amount of flow through the system. In order to control the flow of chemicals to the surge tank 16, a liquid sensor 15, such as a heated thermister, is placed in the inlet line 11. When the sensor 15 is cooled by the presence of liquid, it actuates a timer on the motor 13. The motor 13 may then rotate a brush or the like for a predetermined time period to allow the chemical particles to fall by gravity into the tank 16. A rotating wire brush has been found to act as an effective valve for feeding chemical particles. The use of a dry chemical feeder obviates the requirement for mixing solutions and the use of chemical metering pumps. The chemicals used should be both of a coagulating nature and of a disinfecting nature. By way of example, a mixture of 75 percent alum and 25 percent calcium hypochlorite has been found to materially aid in the production of a high quality effluent.

A positive displacement pump 18 with a variable speed drive is used to convey the conditioned sewage from the surge tank 16 to the filtration-absorption columns 20, 22 and 24. When the surge conditioning tank 16 is less than one-half filled with liquid, the feed pump 18 is programmed to pump at the rate of, for example, 3.5 gal. per minute. This is expected to be the operational mode 90 percent of the time. When the surge tank 16 is filled from one-half to three-fourths of its capacity, the pump will operate, for example, at a rate of 7.5 gal. per minute. When the tank contains a volume of liquid greater than three-fourths of its capacity the pump will be programmed to pump, for example, 10 gal. per minute. The capacity of the pump 18 can be changed by altering the speed of the motor driving the pump. A plurality of level sensors 19 in the tank will signal speed controlling devices to program the pumping speed via electrical cables 21. As indicated, such a program pump operation enables the surge tank to be sized for minimum volume and accordingly, enables the system to be of minimum, overall size.

The liquid medium containing particulate matter is first pumped via conduit 28 to column 20. Each of the columns 20, 22 and 24 contain a separate media performing a multiplicity of functions. Column 20 contains a media consisting of 20 to 50 mesh aluminum powder. This filter media performs a dual function. First, it removes the condition suspended solids remaining in the liquid after the gross solids separation step performed by the separator 12, and second, it adds coagulating ions to the remaining liquid by corrosion of the aluminum powder. These aluminum ions precipitate and coagulate any suspended material and some of the dissolved material remaining in the liquid.

After passing through the filter coagulator column 20, the liquid is conveyed by means of conduits 30 to the second column 22. This column performs a stripping operation. The stripping operation is based upon the principle of electrophoretic coalescence. The remaining colloidal particles in the liquid are anionic, cationic and neutral. To remove these particles of unlike charges, the stripper contains a media that is a mixture of bimetallic particles. Dissimilar materials immersed in an electrolyte react to form a galvanic cell and the materials acquire opposite charges. These charges attract both ion species present in solution.

The stripper column is filled with a mixture including 25 percent by volume of aluminum powder and 75 percent by volume of granular carbon. The column 22 is thus capable of removing most of the remaining suspended solids contained in the liquid.

After passing through column 22, the media is conveyed via conduit 34 to the third in the series of columns, column 24. This third column, an adsorption column, is filled with activated carbon. Activated carbon has the ability to remove up to one-half lb. of COD per pound of carbon in the system.

The non-biological waste treatment system has two basic operating modes, namely, run and backwash. During the run mode of operation the feed pump 18 is energized and the proper on-off valves designated by the numeral 35, 36, and three way valves 37, 38, 40, 42, 44 and 46, are actuated to permit the liquid stored in the surge-conditioning tank 16 to pass through the three filter-adsorber units 20, 22 and 24 to a drain. The backwash mode consists of three operating cycles that permit backwash of each filter-adsorber unit separately. The duration of each of the backwash cycles may be adjusted. Thus, when the system is placed in the backwash mode of operation, the backwash valves of each filter-adsorber unit are sequentially actuated for a preset interval. The system may be automatically programmed to transfer between the two operating modes depending upon the intelligence received from a pressure sensor 48 located on conduit 28.

The pressure sensor 48 measures the pressure exerted by pump 18 in forcing the liquid medium containing particulate matter through the columns 20, 22 and 24. This pressure increases with the amount of particulate matter retained in the columns and primarily column 20, as is known in the art. When this pressure reaches a predetermined level a timer 49 is started which sequentially and separately backwashes the three columns 20, 22 and 24 and then switches back to the run mode.

Backwashing proceeds with the backwash water being drawn from the drain system through a conduit 50. Column 20 is backwashed by opening actuating valves 37 and 38, as can be seen in FIG. 1. Any particulate matter in the backwash water is sent to the coil spring separator 12 and then to the incinerator 26. Then sequentially, valves 42 and 40 may be actuated to backwash column 22 and in like manner, valves 46 and 44 may be actuated to backwash column 24.

After each port stay the waste system 10 may be temporarily shut down for flushing and draining while the ship is at sea. The carbon column 24 can then be flushed with clean sea water containing calcium hypochlorite. This not only sterilizes the column to prevent any biological or marine growths from occurring, but renews the adsorptive capacity of the column since activated carbon will absorb chlorine in preference to an organic material. The chlorine is then removed from the carbon by flushing with clean sea water, draining, and allowing the column to remain in this condition until needed. The cleaning, backwash and shut down procedures can be programmed into the control system so that a single switch will place the unit in standby condition until needed again, when startup will be instantaneous.

It is contemplated that approximately 50 percent of the particulate matter in the sanitary system will be removed by the separator 12 and that this particulate matter can be incinerated. The remaining particulate matter removed by the columns 20, 22 and 24 is recycled through the separator 12 to the incinerator 26 so that essentially all the particulate matter in the waste water is eventually incinerated. The electric incinerator 26 is used for this purpose. As indicated, the solids removed by the solids separating device 12, both those in the raw waste water and in the backwash water, are deposited directly in the incinerator 26 thereby eliminating any transport problem. The particles are first moved through the heated barrel of the incinerator designated in FIG. 2 by the numeral 27. The temperature profile of this barrel 27 is controlled by band heaters clamped to the outside of the barrel. A temperature of 800°F is reached by the solids before exit from the barrel into the incinerator portion designated by the numeral 29. An afterburner embedded in a radiant ceramic plate then heats the exhaust gases in the incinerator portion 29 to about 1,500°F to ensure combustion of all smoke and odoriferous material. Any foreign noncombustible items that pass through the solids separation device and pass through the incinerator will be deposited in the usual ash box beneath the incinerator.

The system also includes a bypass line 52 having a pump 54 and an on-off valve 56 therein. This bypass system may be utilized to pump waste from the system should an overflow condition occur. The system may also include sampling parts 58 and 60 with a baffle 62 separating the tank 16 into two interconnected chambers so as to enable the operator to periodically check the conditioning efficiency with the surge tank 16.

In view of the above, it will be apparent that many modifications and variations are possible in light of the above teachings. It therefore is to be understood that within the scope of the appended claims, the invention may be practiced other than as specifically described.

I claim as my invention:

1. A waste water treatment system comprising:
   an enclosure having an inlet adapted to receive a sewage influent to be conditioned and separate solids and liquid outlets;
   a liquid-solids separator positioned in said enclosure to receive said influent;
   movable means on said separator for separating the solids from the liquid, said means also delivering said solids to the solids outlet;
   an incinerator connected with the solids outlet for burning the solids delivered thereto;
   a surge conditioning tank connected with the liquid outlet for receiving the liquid separated from the solids;
   chemical feed means connected with said tank for introducing chemical substances thereinto for conditioning the liquid; and
   filtration-absorption means connected with an outlet of said tank for removing colloidal material in the chemically treated liquid not removed by said separator to thereby provide a high quality effluent at the filtration-absorption means outlet.

2. The combination according to claim 1 wherein the filtration-absorption means comprises at least one tank-like column having a metallic powder therein capable of precipitating and coagulating material remaining in the liquid delivered to the column and capable of filtering the condition suspended solids in said liquid.

3. The combination according to claim 2 wherein output from the tank-like column is supplied to a second tank-like column connected therewith, said second column containing a mixture of carbon granules and aluminum powder for removing by electrophoretic coalescence any remaining colloidal particles in the liquid supplied thereto which are anionic, cationic and neutral.

4. The combination according to claim 3 wherein the output of said second column is supplied to an absorption column connected therewith, said absorption column containing activated carbon.

5. The combination according to claim 1 wherein said tank has a capacity equal to the minimum average volume of liquid expected to flow through the system during off-peak hours; and
   wherein said filtration-absorption means has a capacity equal to the maximum liquid flow expected in the system during peak hours of use;
   a pump interconnecting the liquid outlet of said tank and the filtration-absorption means;
   liquid level sensing devices attached to said tank; and
   control means responsive to said sensing devices and connected to said pump, the arrangement being such that as the liquid level changes in said tank, the control means causes said pump to increase or decrease its speed in proportion to rise or fall of liquid level in said tank.

6. The combination according to claim 1 wherein a pump interconnects the tank liquid outlet with the filtration-absorption means;
   a liquid pressure sensitive device in the line with said pump for determining the degree of particulate matter in said filtration-absorption means;
   means selectively connecting an outlet from said filtration-absorption means with the inlet to said enclosure containing the separator; and
   backwash means connected to and responsive to said pressure sensitive device for backwashing the filtration-absorption means to deliver the particulate matter therein to the enclosure inlet when the pressure of liquid pumped to the filtration-absorption means reaches a predetermined level.

7. The combination according to claim 2 wherein a pump connects the tank outlet with the tank-like column inlet;
   a liquid pressure sensitive device in the line with said pump and column for detecting the degree of particulate matter in said columns;
   selectively operable valves on opposite sides of each of said columns;
   a backwash liquid supply connected to the valve in the outlet of each column, and pipes connecting the valves in the inlet to each column with said enclosure; and control means responsive to said pressure sensitive device for causing a backwash liquid to flow reversely through said columns to cleanse the latter and deliver the particulate matter therein to said separator when the pump supply pressure reaches a predetermined value.

8. The combination according to claim 1 wherein a liquid flow sensor is connected in the inlet line to said enclosure, and control means responsive to said sensor for feeding the chemical substances into said tank at a rate corresponding to the flow of liquid into said enclosure.

* * * * *